United States Patent
Hinrich et al.

(10) Patent No.: US 11,848,593 B2
(45) Date of Patent: Dec. 19, 2023

(54) STATOR DEVICE FOR AN ELECTRIC MACHINE, AND PRODUCTION METHOD

(71) Applicant: Dr. Ing. h.c. F. Porsche Aktiengesellschaft, Stuttgart (DE)

(72) Inventors: Holger Hinrich, Leonberg (DE); Johannes Wende, Heilbronn (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 100 days.

(21) Appl. No.: 17/700,557

(22) Filed: Mar. 22, 2022

(65) Prior Publication Data

US 2022/0311297 A1 Sep. 29, 2022

(30) Foreign Application Priority Data

Mar. 25, 2021 (DE) .................. 10 2021 107 454.1

(51) Int. Cl.
*H02K 3/24* (2006.01)
*H02K 15/02* (2006.01)
*H02K 1/16* (2006.01)

(52) U.S. Cl.
CPC ............ *H02K 3/24* (2013.01); *H02K 1/165* (2013.01); *H02K 15/024* (2013.01)

(58) Field of Classification Search
CPC ............ H02K 1/16; H02K 1/165; H02K 3/24; H02K 15/02; H02K 15/024
USPC .................................................. 310/216.004
See application file for complete search history.

(56) References Cited

U.S. PATENT DOCUMENTS

| 4,323,802 A | 4/1982 | Leistner |
| 11,165,304 B2 | 11/2021 | Kneidl et al. |
| 11,735,986 B2 * | 8/2023 | Almeida E Silva ..... H02K 1/16 310/195 |
| 2009/0273254 A1 * | 11/2009 | Heim ..................... H02K 15/12 310/195 |
| 2010/0019626 A1 * | 1/2010 | Stout ....................... H02K 3/50 310/214 |
| 2011/0266896 A1 | 11/2011 | Smadja |

(Continued)

FOREIGN PATENT DOCUMENTS

| DE | 102016223084 A1 | 5/2018 |
| DE | 102018112347 A1 | 11/2019 |

(Continued)

*Primary Examiner* — Rashad H Johnson
(74) *Attorney, Agent, or Firm* — LEYDIG, VOIT & MAYER, LTD.

(57) ABSTRACT

A stator device for an electric machine, including a laminated core arrangement with a plurality of receiving grooves for receiving, in each receiving groove, at least one conductor element of a stator winding in a conductor channel, wherein the receiving grooves each provide at least one flow channel, wherein the laminated core arrangement includes a plurality of laminated core units which are lined up axially and which each provide axial groove sections of the receiving grooves, and wherein the groove sections associated with each of the plurality of laminated core units at least in part have a groove geometry variant taken from a group of at least two different groove geometry variants, such that the receiving grooves, over an axial extent along the laminated core arrangement, each have at least two different groove geometry variants.

16 Claims, 4 Drawing Sheets

(56) References Cited

U.S. PATENT DOCUMENTS

| | | | | |
|---|---|---|---|---|
| 2014/0252893 | A1* | 9/2014 | Veeh | H02K 1/32 |
| | | | | 310/58 |
| 2018/0254679 | A1* | 9/2018 | Bernhardt | H02K 3/14 |
| 2019/0068021 | A1* | 2/2019 | Willacker | H02K 5/225 |
| 2019/0109513 | A1* | 4/2019 | Bethge | H02K 9/197 |
| 2019/0363601 | A1 | 11/2019 | Kneidl et al. | |
| 2020/0156296 | A1* | 5/2020 | E Silva | H02K 15/026 |
| 2020/0161917 | A1* | 5/2020 | E Silva | H02K 9/197 |
| 2020/0161947 | A1* | 5/2020 | Almeida E Silva | H02K 15/12 |
| 2020/0185993 | A1* | 6/2020 | Hoerz | H02K 5/1732 |
| 2020/0204024 | A1* | 6/2020 | Hoerz | H02K 9/197 |
| 2020/0235627 | A1* | 7/2020 | Matsumoto | H02K 1/32 |
| 2021/0184529 | A1* | 6/2021 | Eilenberger | H02K 3/30 |
| 2021/0203197 | A1* | 7/2021 | Saint-Michel | H02K 15/024 |
| 2022/0014062 | A1* | 1/2022 | Almeida E Silva | H02K 9/227 |
| 2022/0021274 | A1* | 1/2022 | Iwaschtschenko | H02K 9/197 |
| 2022/0077737 | A1* | 3/2022 | Büttner | H02K 7/003 |
| 2022/0216743 | A1* | 7/2022 | Leonardi | H02K 3/24 |
| 2022/0311297 | A1* | 9/2022 | Hinrich | H02K 1/165 |
| 2022/0393538 | A1* | 12/2022 | Engelhardt | H02K 1/165 |
| 2023/0253844 | A1* | 8/2023 | Haas | H02K 3/24 |
| | | | | 310/65 |

FOREIGN PATENT DOCUMENTS

| | | |
|---|---|---|
| DE | 102019115489 A1 | 12/2020 |
| GB | 2590677 A | 7/2021 |
| JP | S 5588773 U | 6/1980 |
| JP | S 55133640 A | 10/1980 |
| JP | S 5717236 U | 1/1982 |
| JP | 2001231193 A | 8/2001 |
| WO | WO 2015/003738 A1 | 1/2015 |
| WO | WO 2019/146499 A1 | 8/2019 |

* cited by examiner

STATOR DEVICE FOR AN ELECTRIC MACHINE, AND PRODUCTION METHOD

CROSS REFERENCE TO RELATED APPLICATIONS

This application claims benefit to German Patent Application No. DE 10 2021 107 454.1, filed on Mar. 25, 2021, which is hereby incorporated by reference herein.

FIELD

The present invention relates to a stator device for an electric machine and to a method for producing a stator device of said type.

BACKGROUND

A stator device offers an effective dissipation of heat, because conductor elements (also referred to as pins or hairpins) of its stator winding can be directly cooled. It is however crucial that the conductor elements do not tilt or slip, and thus partially or even completely block flow channels, during the installation process. Such blocking of the flow cross section leads inter alia to a significant increase in the pressure loss of coolant flow and overall to an undesired limitation of the cooling action.

DE 10 2018 112 347 A1 therefore describes an electric machine in the case of which spacers are applied in certain sections to the insulation of the conductor elements, which spacers delimit, in certain sections, the coolant channels for direct cooling of the conductor elements. Blocking of the flow channels is prevented by the spacers.

In relation to this, what is needed is further improvement of the protection of the flow channels against blockage by incorrectly positioned conductor elements. Such an improvement would preferably be reliable and at the same time easy to implement from a design and manufacturing aspect.

SUMMARY

In an embodiment, the present disclosure provides a stator device for an electric machine, comprising a laminated core arrangement with a plurality of receiving grooves for receiving, in each receiving groove, at least one conductor element of a stator winding in a conductor channel, wherein the receiving grooves each provide at least one flow channel, wherein the laminated core arrangement comprises a plurality of laminated core units which are lined up axially and which each provide axial groove sections of the receiving grooves, and wherein the groove sections associated with each of the plurality of laminated core units at least in part have a groove geometry variant taken from a group of at least two different groove geometry variants, such that the receiving grooves, over an axial extent along the laminated core arrangement, each have at least two different groove geometry variants.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In relation to this, in an embodiment, the present invention further improves the protection of the flow channels against blockage by incorrectly positioned conductor elements.

The stator device comprises at least one laminated core arrangement with a multiplicity of receiving grooves for receiving in each case at least one conductor element of a stator winding in a conductor channel. The receiving grooves each provide at least one flow channel, which runs along the conductor channel, for a coolant for cooling the conductor elements.

The stator device according to embodiments of the invention are provided for an electric machine and comprise a laminated core arrangement with a multiplicity of receiving grooves. The receiving grooves serve for receiving in each case at least one conductor element of a stator winding. The receiving grooves comprise in each case at least one conductor channel in which in each case at least one conductor element of the stator winding can be at least partially received. The receiving grooves each provide at least one flow channel, which runs along the conductor channel of at least one conductor element, for a coolant for cooling the conductor elements. Here, the laminated core arrangement comprises a multiplicity of laminated core units that are lined up axially. Here, the laminated core units each provide axial groove sections of the receiving grooves. Here, the groove sections associated with a laminated core unit at least in part have a groove geometry variant taken from a group of at least two different groove geometry variants. Here, the receiving grooves, over their (respective) axial courses along the laminated core arrangement, each have at least two different groove geometry variants. In particular, at least two different groove geometry variants are present in the laminated core arrangement. The laminated core units of the laminated core arrangement thus in particular belong to one of the at least two groove geometry variants.

The stator device according to the invention affords numerous advantages. A considerable advantage is afforded by the modular construction composed of laminated core units with groove sections with different groove geometry variants. In this way, different or varying groove geometries and for example flow diversions are possible in targeted fashion along the axial course of the receiving grooves. Furthermore, the blockage of the flow channels by tilted conductor elements, or the tilting itself, can thus be counteracted in targeted fashion. It is also particularly advantageous that a desired geometry of the receiving groove can be formed very easily by lining up laminated core units with different groove geometry variants in targeted fashion. The invention therefore allows particularly fast and economic manufacture of stator devices for electric machines.

The groove geometry variants preferably differ in terms of the arrangements of their flow channels relative to their conductor channels. In particular, the groove geometry variants differ by the fact that the flow channel is arranged in front of or behind the conductor channel in relation to the clockwise direction. In other words, the groove geometry variants differ in particular by the fact that, as seen in a viewing direction from radially inside to radially outside, the flow channel is arranged either to the left or to the right of the conductor channel. Thus, in one particular laminated core unit, the flow channel is thus for example arranged in front of the conductor channel as viewed in the clockwise direction or to the left of the conductor channel. In another particular (in particular adjacent) laminated core unit, the flow channel is then reversed and thus arranged for example behind the conductor channel as viewed in the clockwise direction or to the right of the conductor channel. The result is a course in which the flow channel jumps from one side to the other (and back again etc.), or an alternating course of the flow channel.

It is also possible and preferable for the groove geometry variants to differ by the fact that the flow channel is arranged radially above or radially below the conductor channel. The result is a course in which the flow channel jumps from top to bottom (and back again etc.). Such a course of the flow channel can also be referred to as a radially alternating course.

In all embodiments, it is particularly preferable and advantageous for the flow channel to extend both in front of or behind the conductor channel as viewed in the clockwise direction and at the same time radially above or radially below the conductor channel. The overall result is thus preferably a spiral-like or spiral-shaped course of the flow channel. In particular, the flow channel winds in spiral fashion around the conductor channel. In all embodiments, the turning direction may be clockwise or counterclockwise. It is thus possible for a right-handed spiral (course of the flow channel with clockwise turning) or also a left-handed spiral (course of the flow channel with counterclockwise turning) to be provided. The overall result is then for example a course in which the flow channel jumps from a left-hand side downward and then to the right-hand side and then upward and back to the left-hand side again etc. In another example, a course may be provided in which the flow channel jumps from a right-hand side downward and then to the left-hand side and then upward and back to the right-hand side again etc. Such an embodiment offers a particularly effective and at the same time straightforward possibility for preventing blockages of the flow cross section and at the same time a highly advantageous coolant flow.

In a preferred and advantageous embodiment, the conductor channels are delimited at at least two sides (running in an axial direction) by a wall of the receiving grooves. In particular, here, flow channels are delimited at at least two sides (running in an axial direction) by a wall of the receiving grooves. It is preferable here for the conductor channels and the flow channels to adjoin one another at at least two sides (running in an axial direction). In particular, the groove geometry variants differ with regard to those sides of the conductor channels and of the flow channels at which these adjoin one another. Additionally or alternatively, provision may be made for the groove geometry variants to differ with regard to those sides at which the conductor channels and the flow channels are delimited by the wall of the receiving grooves. In particular, the groove geometry variants differ with regard to those sides of the conductor elements with which these bear against the wall of the receiving groove. In particular, the conductor elements bear against different sections of the wall of the receiving groove depending on the groove geometry variant.

Preferably, the laminated core units with the different groove geometry variants are lined up axially such that, in the receiving grooves, the flow channel runs in each case in spiral fashion around the conductor channel (and preferably also the conductor element that can be received therein). The laminated core units with the different groove geometry variants are preferably lined up axially such that a conductor element bears alternately with at least one different side against the wall of the receiving groove.

In all embodiments, it is particularly preferable for adjacent laminated core units to have different groove geometry variants.

Preferably, at least two of the at least two groove geometry variants are formed by virtue of at least two laminated core units being installed having been turned through 180° relative to one another in the laminated core arrangement. Here, the laminated core units are in particular of geometrically identical form at least with regard to the receiving grooves. The laminated core units may also be identical. Such turning allows particularly straightforward implementation of a varying groove geometry, because there is no need to stock or manufacture different laminated core units. In particular, an axis for such turning lies transversely with respect to the axis of rotation of the electric machine and/or transversely with respect to the longitudinal axis or axial extent of the stator device.

It is preferred and advantageous that, as a result of the turning of the laminated core unit through 180°, it is possible to set whether the flow channel of a receiving groove is arranged in front of or behind the conductor channel of said receiving groove as viewed in the clockwise direction (or with regard to a viewing direction from radially inside to radially outside). As a result of the turning, the flow channel changes in particular from one longitudinal side to the other longitudinal side of the conductor channel.

It is likewise preferable and advantageous for at least two of the at least two groove geometry variants to be formed by virtue of at least two geometrically differently configured laminated core units being installed in the laminated core arrangement. In particular, the laminated core units differ here in terms of their receiving grooves. In particular, the laminated core units differ from one another independently of whether or not they are turned. In particular, the receiving grooves of such laminated core units cannot be brought into geometric correspondence by turning.

In one advantageous embodiment, it is provided that, depending on the groove geometry variant, the flow channel of a receiving groove is arranged radially to the inside or radially to the outside of the conductor channel of said receiving groove. In particular, an alternation of the flow channel from radially inside to radially outside is implemented by virtue of laminated core units with such different groove geometry variants being lined up axially.

In all embodiments, it is preferable and advantageous for the group of groove geometry variants to comprise at least four different groove geometry variants. In particular, the groove geometry variants are formed by virtue of at least two geometrically differently configured laminated core units being installed in the laminated core arrangement and by virtue of the differently configured laminated core units furthermore at least also being installed having been turned in each case through 180° in the laminated core arrangement. In particular, it is thus achieved that the receiving grooves, along their course through the laminated core arrangement, each have at least four different groove geometry variants. In particular, at least four different groove geometry variants are present in the laminated core arrangement. The laminated core arrangement preferably comprises a multiplicity of laminated core units (for example at least eight or at least twelve or more) which each have at least one of four different groove geometry variants.

The laminated core units installed having been turned through 180° relative to one another are preferably arranged axially adjacently in pairs. The geometrically differently configured laminated core units are preferably arranged axially adjacently in pairs. Here, in particular, between the geometrically differently configured laminated core units, there is arranged in each case one laminated core unit that has been turned through 180°.

It is particularly preferable for the at least four different groove geometry variants to be lined up in a repeating sequence in the laminated core arrangement.

For example, a laminated core unit with a first geometrical form is followed by a laminated core unit of the same (first) geometrical form, which has been turned through 180°. This is followed, for example, by a laminated core unit with a second geometrical form. This is followed in particular by the laminated core unit of the same (second) geometrical form which has been turned through 180°. This sequence is preferably repeated, such that it is followed again by a laminated core unit with the first geometrical form.

It is possible and advantageous that the four different groove geometry variants in combination with one another fix the conductor elements in form-fitting fashion along the laminated core arrangement in a total of four directions. In particular, the conductor elements are fixed in form-fitting fashion in front and behind in the clockwise direction (or with regard to a viewing direction from radially inside to radially outside), and radially at the top and radially at the bottom, in relation to the conductor channel. Here, the conductor elements may be supported on the wall of the receiving groove and/or on adjacent conductor elements.

It is preferred that the flow channel performs at least one spiral-shaped turn about the conductor channel over in each case four axially adjacent laminated core units with different groove geometry variants. In particular, four adjacent groove geometry variants in combination with one another result in a spiral-like turn of the flow channel.

The applicant reserves the right to claim an electric machine having a stator device according to the invention. Such an electric machine also particularly advantageously achieves the above-stated object. The electric machine is provided in particular for a drivetrain of an electric vehicle or hybrid vehicle. The electric machine may comprise at least one rotor that is rotatable relative to the stator device, and/or further electric machine components.

In the context of the present invention, the terms "axial" and "radial" relate in particular to an axis of rotation and/or longitudinal axis of the electric machine. The term "radially outside" can also be referred to as "yoke side", and the term "radially inside" can also be referred to as "head side".

The flow channel is defined in particular by the position of the conductor elements in the receiving groove. In particular, the flow channel corresponds (only) to a free space, which is not occupied by the conductor elements, in the receiving groove. In particular, the conductor channel corresponds to the space occupied by the conductor elements in the receiving groove. The stator device may comprise at least one stator winding with at least one conductor element and preferably with a multiplicity of conductor elements.

In particular, the laminated core units each comprise a multiplicity of laminations. In the context of the present invention, a laminated core arrangement is also to be understood in particular to mean one which is assembled from solid and for example single-piece laminated core units. The groove geometry variants differ in particular in terms of the groove geometry of the groove section for the receiving grooves. In particular, the groove geometry relates to a cross-sectional geometry of the receiving groove.

In particular, the receiving grooves run at least in certain sections in an axial direction through the laminated core arrangement. In particular, the conductor channels or conductor elements run at least in certain sections in an axial direction through the laminated core arrangement and preferably through the receiving grooves. In particular, the conductor channels and in particular also the flow channels run at least in certain sections along the conductor elements. In particular, the conductor channels run parallel to the conductor elements.

In particular, the flow channel and the conductor channel adjoin one another and in particular also the conductor elements. In particular, the flow channel adjoins the conductor channel by way of only two (in particular mutually adjoining) sides. In particular, the conductor channel adjoins the flow channel by way of only two (in particular mutually adjoining) sides.

The method according to the invention serves for the production of a stator device. In particular, the method is configured such that the above-described stator device can be produced in accordance with said method. Here, the laminated core units are lined up axially and, by turning about an axially running axis of rotation, are oriented relative to one another such that the axial groove sections of the individual laminated core units have an overlap with one another which amounts in particular to at least 75% and preferably at least 90% of a greatest possible overlap. The greatest possible overlap is particularly preferably provided. It is also possible for the axial groove sections of the individual laminated core units to have an offset with respect to one another which deviates from a least possible offset in particular by at most 25% and preferably by at most 10%. The least possible offset is particularly preferably provided. In particular, the laminated core units are oriented relative to one another such that, along the receiving groove, at least 75% and preferably at least 90% of a largest possible groove cross-sectional passage area and/or a maximum receiving groove passage (or largest groove opening) are/is present. In particular, the groove sections of the individual laminated core units are oriented in flush alignment with one another with regard to their axial cross-sectional openings.

The conductor elements are then arranged in the receiving grooves. The laminated core units are then, by turning about an axially running axis of rotation, are oriented relative to one another such that the axial groove sections of the individual laminated core units have an offset with respect to one another, by means of which the conductor elements are fixed in the receiving grooves (in particular by clamping). The laminated core units are then preferably secured against further axial turning. In particular, the securing is implemented in form-fitting and/or force-fitting and/or cohesive form. In particular, the stator device according to the invention is configured such that it can be produced in accordance with the method.

Further advantages of the present invention will emerge from the exemplary embodiments, which will be discussed below with reference to the appended figures.

Figure 1:
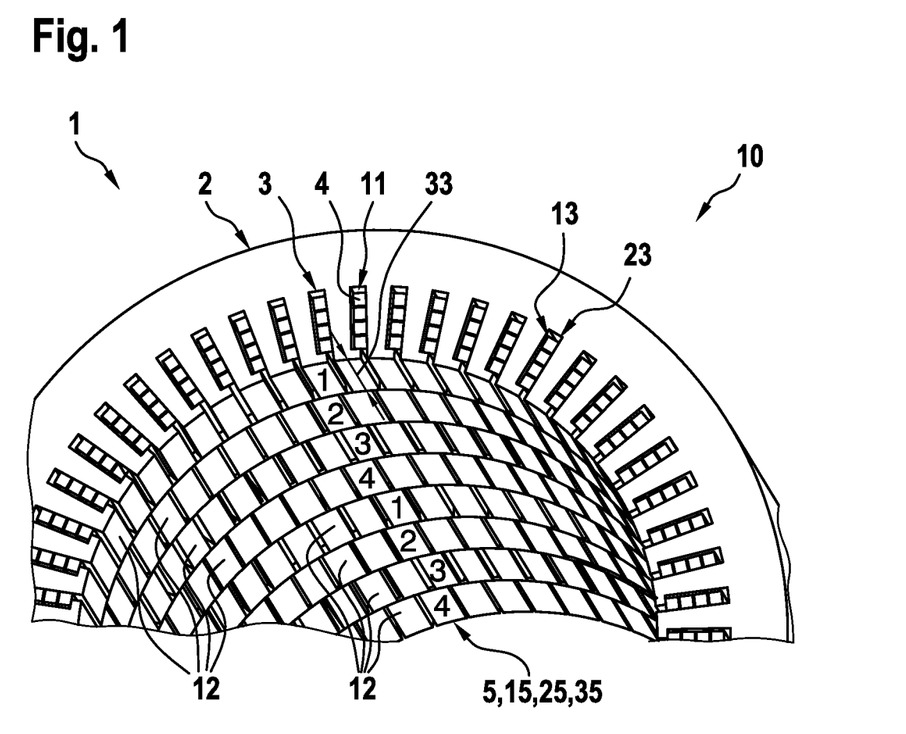
FIG. 1 is a schematic illustration of a stator device according to an embodiment of the invention in a sectional perspective view obliquely from below.

FIG. 1 shows, in a detail, a stator device 1 according to the invention for an electric machine 10. Here, the stator device 1 has been produced in accordance with the method according to the invention. The electric machine 10 may for example be configured as an electric motor for a drivetrain of an electric vehicle or hybrid vehicle.

Here, the stator device 1 comprises a laminated core arrangement 2 with a multiplicity of laminated core units 12 which are lined up axially. The number of laminated core units 12 here is merely exemplary and may be greater or smaller depending on the design specifications for the machine 10. The laminated core units 12 may be composed of individual laminations or plates or may also be of solid form. Here, the laminated core units 12 each provide axial groove sections 33 of the receiving grooves 3.

Here, the stator device 1 comprises a stator winding 11 with a multiplicity of electrical conductor elements 4 which are contacted with one another and which are for example in the form of copper pins. Here, the conductor elements 4 run in groups in receiving grooves 3. The receiving grooves 3 extend in an axial direction through the laminated core arrangement 2 and are arranged so as to be (uniformly) distributed and spaced apart over the circumference thereof.

In order to allow particularly effective cooling of the stator device 1, the conductor elements 4 are in this case directly cooled. For this purpose, a coolant flows through a flow channel 23 that runs within each receiving groove 3. The flow channels 23 are defined here by the position of the conductor elements 4 in the receiving grooves 3. A flow channel 23 corresponds here to the free space, which is not occupied by the conductor elements 4, within the receiving groove 3. That space which is intentionally occupied by the conductor elements 4 within the receiving groove 3 is defined as the conductor channel 13. Here, the receiving grooves 3 are thus divided into the conductor channel 13 and the flow channel 23.

The receiving groove 3 surrounds the conductor channel 13 and the flow channel 23 with a wall 43. Here, the wall 43 is interrupted at a radial inner side of the laminated core arrangement 2. The conductor elements 4 can thus be installed particularly straightforwardly into the receiving grooves 3 during the production of the stator device 1. An embodiment with a peripherally closed wall 43 is however also possible.

Here, the laminated core arrangement 2 has four different groove geometry variants 5, 15, 25, 35. The conductor channel 13 and the flow channel 23 are positioned differently in the receiving groove 3 depending on the groove geometry variant 5, 15, 25, 35.

Here, the laminated core units 12 belong to in each case one of the groove geometry variants 5, 15, 25, 35. For a better illustration of the lined-up arrangement, the four groove geometry variants 5, 15, 25, 35 are numbered in FIG. 4. It can thus be clearly seen that the four different groove geometry variants 5, 15, 25, 35 are lined up in a repeating sequence.

Figure 2:
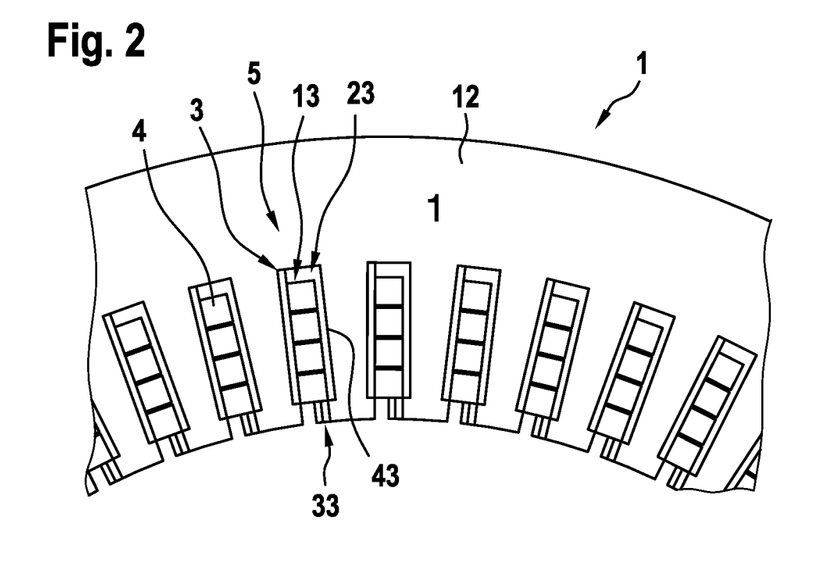
FIG. 2 is a schematic detail illustration of a first groove geometry variant of the stator device as per FIG. 1.
Figure 3:
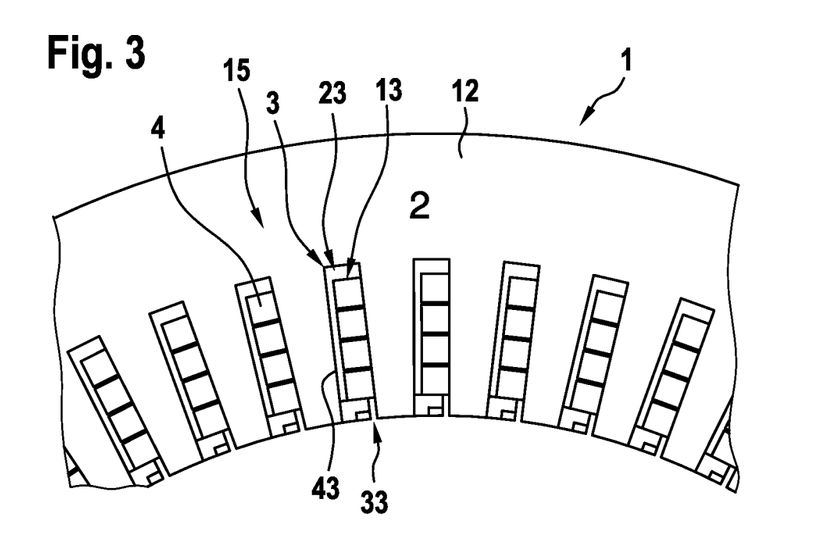
FIG. 3 is a schematic detail illustration of a second groove geometry variant of the stator device as per FIG. 1.

The individual groove geometry variants 5, 15, 25, 35 are illustrated in more detail in FIGS. 2 to 5. Here, FIG. 2 shows a first groove geometry variant 5, in the case of which the flow channel 23 is arranged radially at the right-hand side (in front of the conductor channel 13 as viewed in the clockwise direction) and radially at the top in the receiving groove 3. FIG. 3 shows a second groove geometry variant 15, in the case of which the flow channel 23 is arranged radially at the left-hand side (behind the conductor channel 13 as viewed in the clockwise direction) and radially at the top in the receiving groove 3.

The two groove geometry variants 5, 15 are realized here by identically configured laminated core units 12. For the second groove geometry variant 15, the corresponding laminated core 12 is turned through 180° and then lined up in the laminated core arrangement 2.

Figure 4:
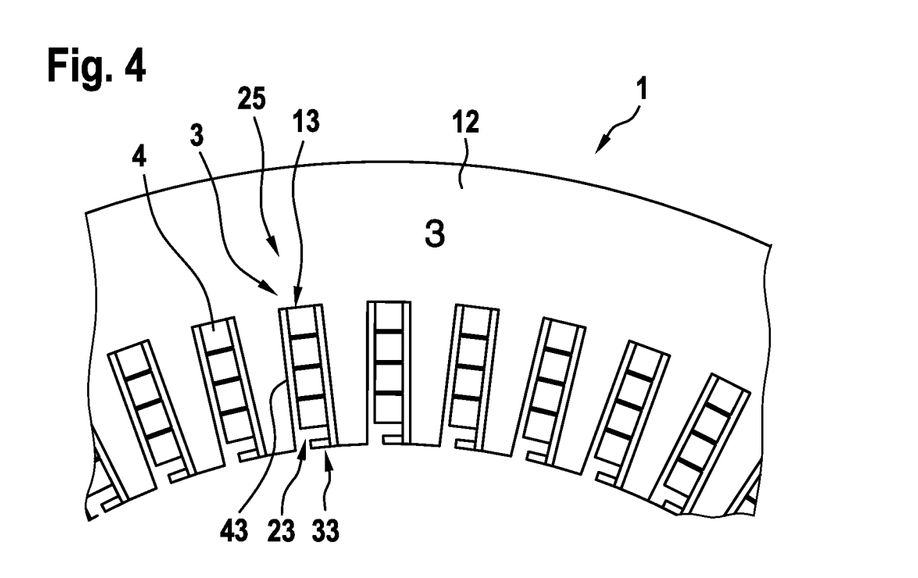
FIG. 4 is a schematic detail illustration of a third groove geometry variant of the stator device as per FIG. 1.
Figure 5:
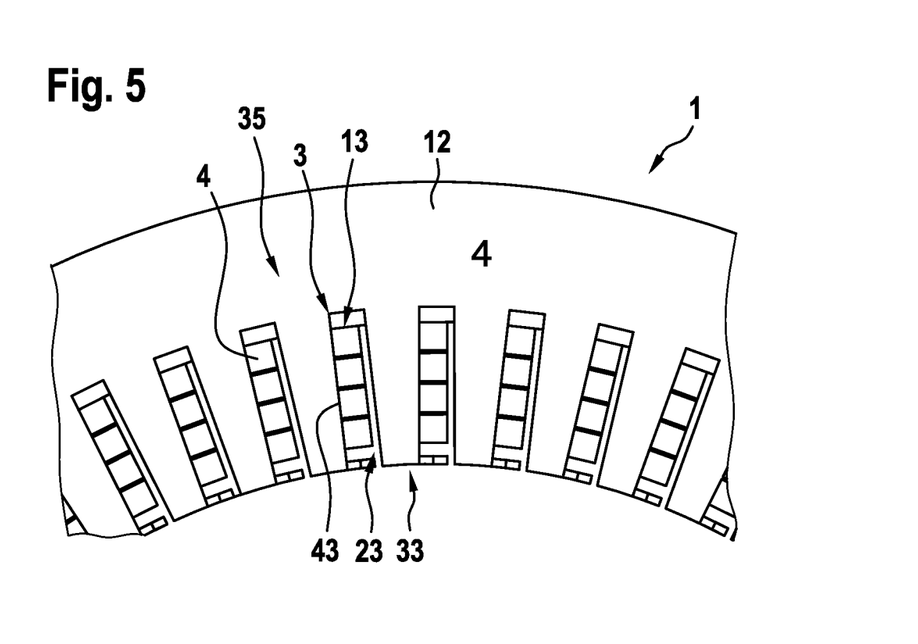
FIG. 5 is a schematic detail illustration of a fourth groove geometry variant of the stator device as per FIG. 1.

FIG. 4 shows a third groove geometry variant 25, in the case of which the flow channel 23 is arranged here radially at the left-hand side and radially at the bottom in the receiving groove 3. A fourth groove geometry variant 35 is shown in FIG. 5. Here, the flow channel 23 is arranged radially at the right-hand side and radially at the bottom in the receiving groove 3. The third and fourth groove geometry variants 25, 35 are also realized here by geometrically identically configured laminated core units 2, one of which has been installed having been turned through 180° in the laminated core arrangement 2.

Figure 6:
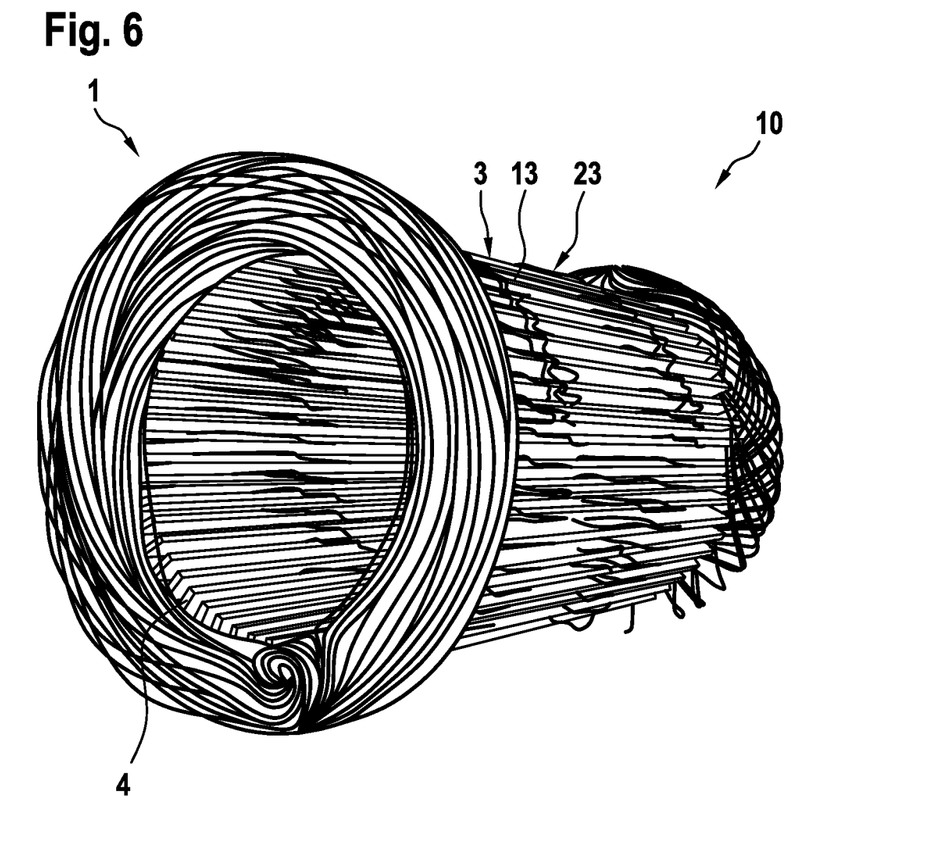
FIG. 6 is a schematic illustration of a stator device according to an embodiment of the invention in a perspective view obliquely from the front, with depicted flow profiles.

The above-described laminated core units 12 give rise, in the line-up arrangement as shown in FIG. 1, to a spiral-like course of the flow channels 23 about the respectively associated conducted channels 13. FIG. 6 depicts the flow profiles that result from this. Of the stator device 1, only the conductor elements 4 are illustrated here, for the sake of better clarity. The receiving grooves 3 with their conductor channels 13 and the flow channels 23 run along the conductor elements 4. From the depicted flow profiles, it can be seen how the flow channels 23 wind around the conductor elements 4 received in the conductor channels 13.

During an exemplary production process, before the insertion of the conductor elements 4, the individual laminated core units 12 are arranged or turned so as to yield a groove opening of maximum size, or the largest possible groove area, across the entire laminated core arrangement 2.

The conductor elements 4 are then installed into the receiving grooves 3, and the individual laminated core units 12 are turned after the conductor elements 4 have been inserted. The individual conductor elements 4 are thus fixed within the receiving grooves 3. The conductor elements 4 bear in a circumferential direction against the laminated core walls. As a result of the laminated core units 12 bearing against the conductor elements 4, and the resulting forces in the circumferential direction, the conductor elements 4 are positively and reliably fixed in their position.

In this now turned position, the laminated core units 12 are then fixed relative to one another such that they can no longer turn back relative to one another. For this purpose, it is conceivable for a weld seam to be provided in the back of the stator, or for dowels to be axially pushed through or for the laminated core units 12 to be adhesively bonded, or for the individual laminated core units 12 to be screwed together. In this way, simplified assemblability is ensured, and tilting of the conductor elements in the receiving groove is prevented (in form-fitting fashion) owing to the design.

With the invention proposed here, blocking of the flow channels 23 by conductor elements 4 which are not oriented as desired, and which have for example tilted, can be prevented in an effective manner. The lining-up of different groove geometry variants 5, 15, 25, 35 as shown here has the result that the conductor elements 4 are fixed in form-fitting fashion along the laminated core arrangement 2 in a total of four directions. Here, the flow cross section of the flow channels 23 is reliably kept open. Through the use of individual laminated core units 12 that provide the respective groove geometry variants 5, 15, 25, 35, such securing of the conductor elements 4 in the receiving grooves 3 can be implemented in a particularly straightforward manner in terms of design and manufacturing.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Stator device
2 Laminated core arrangement
3 Receiving groove
4 Conductor element
5 Groove geometry variant
10 Machine
11 Stator winding
12 Laminated core unit
13 Conductor channel
15 Groove geometry variant
23 Flow duct
25 Groove geometry variant
33 Groove section
35 Groove geometry variant
43 Wall

The invention claimed is:

1. A stator device for an electric machine, comprising:
a laminated core arrangement with a plurality of receiving grooves for receiving, in each receiving groove, at least one conductor element of a stator winding in a conductor channel, wherein:
the receiving grooves each provide at least one flow channel, which runs along the conductor channel of the at least one conductor element, for a coolant configured to cool the at least one conductor element,
the laminated core arrangement comprises a plurality of laminated core units which are lined up axially and which each provide axial groove sections of the receiving grooves, and
the groove sections associated with each of the plurality of laminated core units at least in part have a groove geometry variant taken from a group of at least two different groove geometry variants, such that the receiving grooves, over an axial extent along the laminated core arrangement, each have at least two different groove geometry variants.

2. The stator device as claimed in claim 1, wherein the groove geometry variants differ in terms of respective arrangement of flow channels relative to conductor channels.

3. The stator device as claimed in claim 1, wherein:
the conductor channels are delimited at at least two sides by walls of one of the receiving grooves,
the flow channels are delimited at at least two sides by walls of one of the receiving grooves,
the conductor channels and the flow channels adjoin one another at at least two sides, and
the groove geometry variants differ with regard to those sides of the conductor channels and of the flow channels at which the conductor channels and the flow channels adjoin one another.

4. The stator device as claimed in claim 1, wherein the laminated core units with the different groove geometry variants are lined up axially such that, in the receiving grooves, the flow channel of a respective receiving groove runs in spiral fashion around the conductor channel.

5. The stator device as claimed in claim 1, wherein adjacent laminated core units have different groove geometry variants.

6. The stator device as claimed in claim 1, wherein at least two groove geometry variants are formed by virtue of at least two laminated core units being installed having been turned through 180° relative to one another in the laminated core arrangement.

7. The stator device as claimed in claim 6, wherein, by turning the laminated core unit through 180°, the flow channel of a receiving groove is configurable to be arranged in front of or behind the conductor channel of the receiving groove as viewed in the clockwise direction.

8. The stator device as claimed in claim 1, wherein at least two groove geometry variants are formed by virtue of at least two geometrically differently configured laminated core units being installed in the laminated core arrangement.

9. The stator device as claimed in claim 1, wherein, depending on the groove geometry variant, the flow channel of at least one receiving groove of the plurality of receiving grooves is arranged radially to the inside or radially to the outside of the conductor channel of the at least one receiving groove.

10. The stator device as claimed in claim 1, wherein the group of groove geometry variants comprises at least four different groove geometry variants which are formed by virtue of at least two geometrically differently configured laminated core units being installed in the laminated core arrangement and also being installed having been turned in each case through 180° in the laminated core arrangement.

11. The stator device as claimed in claim 10, wherein the laminated core units installed having been turned through 180° relative to one another are arranged axially adjacently in pairs, and wherein the geometrically differently configured laminated core units are also arranged axially adjacently in pairs.

12. The stator device as claimed in claim 10, wherein the four different groove geometry variants are lined up in a repeating sequence in the laminated core arrangement.

13. The stator device as claimed in claim 10, wherein the four different groove geometry variants in combination with one another fix the conductor elements in form-fitting fashion along the laminated core arrangement in a total of four directions.

14. The stator device as claimed in claim 10, wherein at least one of the flow channels performs one spiral-shaped turn about a respective conductor channel over four axially adjacent laminated core units with different groove geometry variants.

15. A method for producing a stator device as claimed in claim 1, the method comprising: the laminated core units are lined up axially and, by turning about an axially running axis of rotation, are oriented relative to one another such that the axial groove sections of the individual laminated core units have a greatest possible overlap with one another, the conductor elements are then arranged in the receiving grooves, and the laminated core units are then, by turning about an axially running axis of rotation, oriented relative to one another such that the axial groove sections of each of the laminated core units have an offset relative to one another so as to fix the conductor elements in the receiving groove.

16. The method as claimed in claim 15, wherein the laminated core units are then secured against further axial turning.

\* \* \* \* \*